United States Patent

Werner

[15] 3,694,895
[45] Oct. 3, 1972

[54] METHOD OF MOUNTING AN AUTOMOBILE ENGINE

[72] Inventor: Lawrence E. Werner, Grosse Pointe, Mich.

[73] Assignee: Chrysler Corporation, Highland Park, Mich.

[22] Filed: June 9, 1971

[21] Appl. No.: 151,325

Related U.S. Application Data

[62] Division of Ser. No. 884,857, Dec. 15, 1969.

[52] U.S. Cl. .........................29/469, 29/150, 29/526
[51] Int. Cl. ............................................B23p 21/00
[58] Field of Search ....29/150, 436, 469, 526; 64/11; 248/7, 9, 10; 287/85 R

[56] References Cited

UNITED STATES PATENTS

| | | | |
|---|---|---|---|
| 1,731,540 | 10/1929 | Powell | 248/9 |
| 1,731,837 | 10/1929 | Wood | 248/9 |
| 2,378,874 | 6/1945 | Trott | 248/7 |
| 1,862,483 | 6/1932 | Lord | 248/10 |
| 2,308,458 | 1/1943 | Saurer | 248/7 |
| 2,321,715 | 6/1943 | Wahlberg | 248/7 |
| 1,835,575 | 12/1931 | Sanders et al. | 64/11 X |
| 2,329,829 | 9/1943 | Clayton | 248/7 |
| 2,582,040 | 1/1952 | Kammritz | 29/150 |
| 3,432,911 | 3/1969 | Rodgers | 29/469 X |

*Primary Examiner*—Charlie T. Moon
*Attorney*—Talburtt & Baldwin

[57] ABSTRACT

An automobile engine is assembled with the body by providing an engine mount comprising a tubular member enclosed within an elastic bushing under sufficient pressure to extrude a portion thereof through a radial opening in the tubular member. A bolt having an annular detent receiving groove is adjustably inserted into the tubular member until its groove receives the bushing extruded portion at a detent position with the bolt ends extending beyond the assembly of the bushing and tubular member. The engine with said assembly secured thereto is lowered toward the body in predetermined relationship by confining the extending bolt ends within a pair of upwardly opening guide slots in a corresponding pair of brackets secured to the body and guiding said bolt ends downwardly along said slots to predetermined seated locations at the bases of said slots, whereupon the bolt is withdrawn from its detent position and clamped securely to said brackets in final position by tightening a nut at one end of the bolt.

2 Claims, 5 Drawing Figures

PATENTED OCT 3 1972

INVENTOR.
Lawrence E. Werner

Talburtt & Baldwin

ATTORNEYS

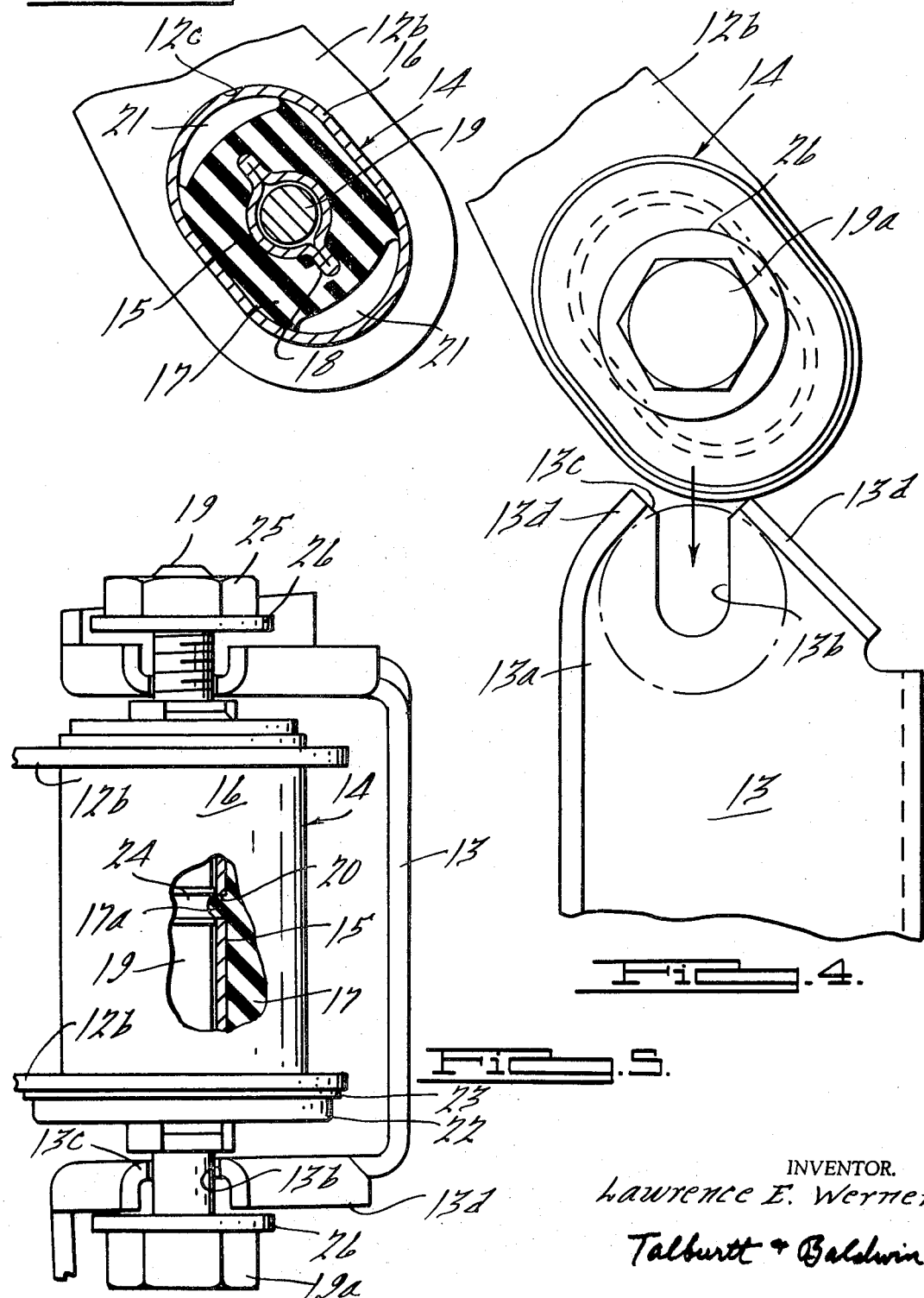

METHOD OF MOUNTING AN AUTOMOBILE ENGINE

CROSS REFERENCE TO RELATED APPLICATION

This application is a division of copending application Ser. No. 884,857, filed Dec. 15, 1969.

BACKGROUND AND SUMMARY OF THE INVENTION

This invention relates to an improved method for mounting an automobile engine on a vehicle body utilizing a voided bushing to optimum advantage to obtain a fail safe structure in the event of bushing deterioration, to facilitate tuning and vibration isolation to accommodate engine modifications, yet to provide a positive resilient engine support for limiting all components of engine movements, and in particular to reduce engine roll significantly to approximately one-third of former requirements for comparable engine mountings without sacrificing vibration absorbing qualities.

In a preferred application, a bushing assembly is provided comprising inner and outer tubular members spaced by an intermediate elastic bushing of rubberlike material. The outer tubular member is forced into axially spaced aligned openings within a pair of engine brackets adapted to be secured in predetermined fixed position to one side of the engine with the axes of the tubular members extending longitudinally of the automobile body. The outer tubular member is out-of-round and preferably of oval cross section conforming to the shape of the aligned bracket openings and dimensioned to effect an interference fit therein at its axially opposite ends, whereby relative rotation between the bushing assembly and engine brackets is prevented.

An important object of the invention is to facilitate mounting of the automobile engine on the body. By guiding the bolts to the bases of guide slots in fixed brackets on the body, a heavy engine that cannot be readily handled without the aid of a mechanical hoist may be quickly and accurately dropped into the preassembled position and properly located on the body. The assembly is completed merely by tightening clamping means, which may simply comprise an enlarged head integral with one end of the bolt and an enlarged nut screwed on the other end.

Prior to assembly, detent means comprising a resilient detent projection of each elastic bushing registering in an annular detent groove within the associated bolt releasably holds the latter at a preassembled detent position within its inner tubular member, whereat the bolt head and nut are spaced outwardly of the fixed brackets to freely clear the same and enable downward movement of the bolt within the guide slots upon lowering of the engine.

The mounting described is particularly suitable for use as a front engine mounting, such that similar mountings are employed at opposite forward side portions of the engine with the bolts extending generally longitudinally of the vehicle body. The elastic bushing of each assembly is forced into the associated outer tubular member to compress the bushing in the direction of the shorter dimension of the oval cross section, and is provided with diametrically spaced axially extending voids within the larger cross sectional dimension. In this regard the resilient detent projection comprises a portion of the compressed elastic bushing extruding radially through an opening in the sidewall of the inner tubular member. When the nut is tightened to the final clamping position, the bolt is forced axially relative to the detent projection, causing the latter to yield from its detent position within the detent groove.

Other objects of this invention will appear in the following description and appended claims, reference being had to the accompanying drawings forming a part of this specification wherein like reference characters designate corresponding parts in the several views.

FIG. 3 is a transverse sectional view through the bushing assembly, taken in the direction of the arrows substantially along the line 3—3 of FIG. 2.

FIG. 4 is a fragmentary front elevational view showing the relationship between the engine and body brackets prior to assembly.

FIG. 5 is a plan view of the structure illustrated in FIG. 4.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
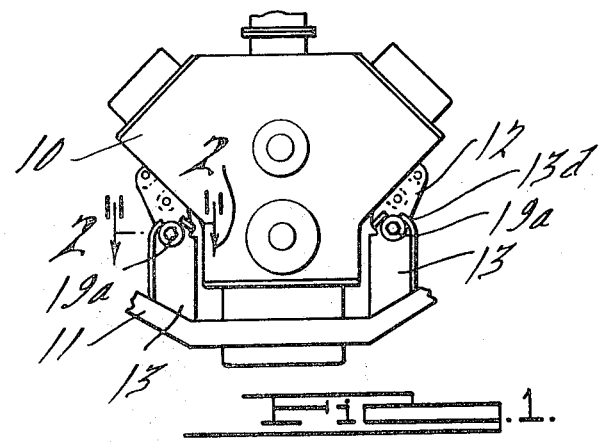
FIG. 1 is a schematic front elevational view of an engine mounted on a portion of an automobile body in accordance with the present invention.

Referring to the drawings, an automobile engine 10 is schematically illustrated in FIG. 1 mounted on a body cross member 11 of a vehicle by means of an engine bracket 12 and body bracket 13 interconnected by a voided bushing assembly 14 at opposite sides of the engine. The brackets 12 and 13 are each one-piece steel channel structures described in more detail below, the engine bracket 12 providing means for adjustable attachment to the engine 10, as for example by bolts. The bracket 13 is likewise suitably secured to the body member 11 in a predetermined position of alignment, as for example by bolts or by welding.

Each bushing assembly 14 comprises inner and outer steel tubular members 15 and 16 respectively spaced by an elastic bushing 17 of rubber-like material. The inner tubular member 15 comprises a tube flattened at diametrically opposite sides 18 to provide greater shear resistance within the bushing 17, has a central axially extending circular opening for the shank of a bolt 19 of a screw threaded clamping means, and a pair of diametrically spaced radial openings 20 in its sidewall into which a detent projection 17a of the busing 17 extends. The inner tubular member 15 is suitably bonded to the bushing 17 and may comprise an insert within the molded bushing 17 or may be forced therein after the bushing is molded.

The outer tubular shell or member 16 has an oval cross section enlarged in the direction of the flats 18 and is also bonded to the bushing 17 forced therein. In this regard, a thermosetting bonding resin may be applied to the parts to lubricate and facilitate insertion of the bushing 17 under compression into the confines of the outer shell 16. Thereafter the resin is cured to effect the bond. Each bushing 17 is compressed in its short radial direction and is relieved in the long radial direction of the flats 18 to provide axially extending voids 21. In the present instance each bushing 17 is provided with an integral annular locating flange 22 at one end which abuts a similar locating flange 23 of the member 16 to facilitate assembly of these members when they are forced together.

Each of the engine brackets 12 has a pair of axially spaced channel sides 12b containing a pair of aligned oval openings 12c respectively conforming closely to the outer contour of the member 16 therein to effect an interference fit therewith and to receive the latter when pressed therein, thereby to prevent relative rotation of the bushing assembly 14 within the bracket 12. If desired, the assembled member 16 and bracket channel sides 12b may be further secured against disassembly, as for example by staking.

The opposite channel sides or bracket arms 13a of each body bracket 13 are provided with a pair of upwardly opening guide slots 13b respectively adapted to receive the opposite ends of one of the bolts 19 therein. The openings of the slots 13b are chamfered at 13c to facilitate downward guided movement of the bolt 19. Each channel arm 13a adjacent opposite sides of the opening of its slot 13b is flanged axially outwardly at 13d. The bolt 19 is provided with an annular detent groove 24 rolled into its periphery at a predetermined location with respect to the opening 20 to receive the detent projection 17a during assembly as described below. The pair of annular beads 24a spaced by the groove 24 and resulting from the rolling operation by which the latter is formed increase its effective depth. The bolt 19 is also formed with a conventional integral hexagonal bolt head 19a at one end and is threaded at its opposite end to receive a nut 25. A pair of steel washers 26 oversize with respect to the associated slots 13b are provided integrally with the bolt head 19a and nut 25 respectively.

After the brackets 12 and 13 are properly secured to the engine 10 and body 11 in their desired fixed positions, with the associated channel sides or elements 12b and 13a spaced axially, or longitudinally of the vehicle body, and with a bushing assembly 14 pressed into and suitably retained within the mating oval holes 12c in each pair of channel sides 12b, a bolt 19 is inserted axially through each of the inner tubular members 15 until the elastic detent projection 17a engages within the detent groove 24. Although the projection 17a is releasable from the groove 24 upon the application of sufficient axial force to the bolt 19, the pressurized material of the bushing 17 at 17a will effect a definite detent action to enable the operator to determine by feel when the bolt is properly located at its detent position, FIG. 5.

A nut 25 with its integral washer 26 is then loosely screwed on the threaded end of each bolt 19, which at the detent position is located axially within its member 15 so that the nut 25 and bolt head 19a with their respective integral washers 26 will freely clear the flanges 13d; FIG. 4, when the engine 10 is lowered into position, as for example by means of a mechanical hoist. In this regard the bolt 19 fits closely within the member 15 to avoid play therein and is retained at the detent position by the interengagement between the projection 17a and groove 24 in the event the bolt should accidentally strike one of the bracket arms 13a during assembly, for example, or the engine 10 is tilted.

As the engine 10 is lowered, the opposite ends of the bolts 19 are guided into the chamfered openings 13c and downwardly within the corresponding slots 13b to a preassembled position supported on the bases of the slots. The engine will be thus located by the bolts 19 supported on the bases of the slots 13b, whereupon the nuts 25 are tightened to draw the bolts 19 axially from their detent positions and clamp the washers 26 against the adjacent channel arms 13a, FIG. 2, thereby to stress the latter tightly in a positive clamping action against the bushing assembly 14. By inserting the bolts 19 to the detent positions within the inner members 15 prior to lowering the engine to its partially assembled position, no further adjustment or positioning of the engine is required at the latter position (except for tightening the nuts 25) and all problems relating to aligning and locating the brackets 12 and 13 with respect to each other, as for example to enable insertion of bolts 19 through aligned bolt holes in these brackets, are avoided.

Figure 2:
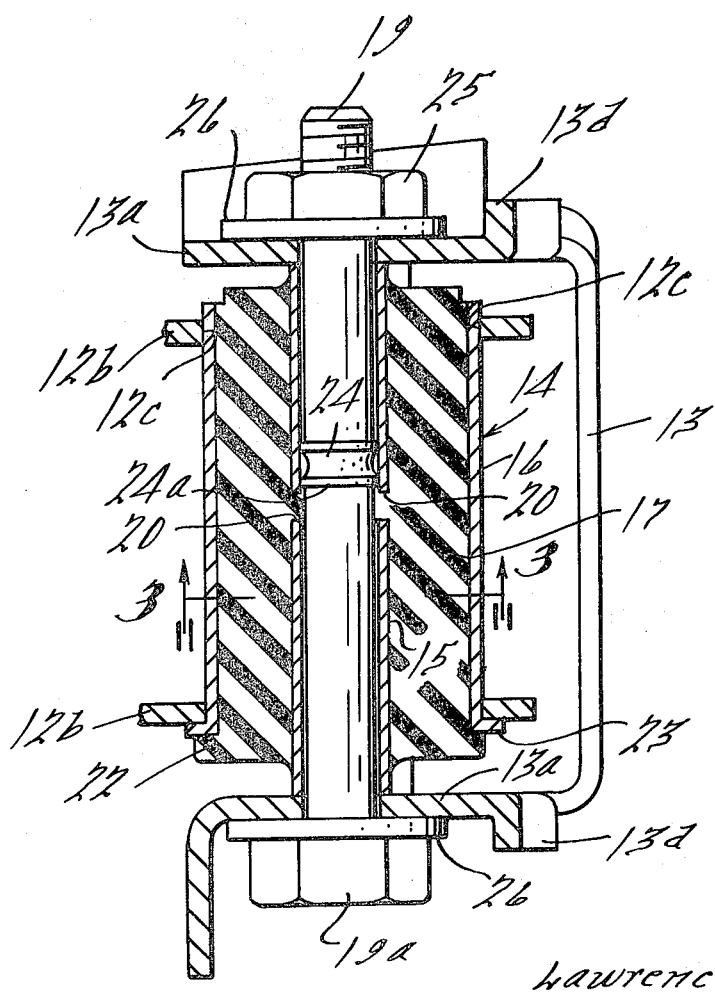
FIG. 2 is an enlarged longitudinal sectional view taken in the direction of the arrows substantially along the line 2—2 of FIG. 1.

As indicated in FIGS. 2 and 4, at the clamping position the washers 26 will closely underlie the flanges 13d to prevent upward movement of the bushing assembly 14. The lower portions of the slots 13b adjacent their bases conform closely to the associated bolt 19 to prevent its lateral displacement. Also each inner tubular member 15 extends axially beyond the associated outer tubular member 16 and is thus engaged by the channel arms 13a. In consequence the engine 10 is resiliently supported by the elastic bushing 17 for limited cushioned movement in any direction, whether linear, pivotal, or a combination of such movements. In the event of engine roll, the void 21 edgewise of the flat 18 extending in the direction of the roll will be partially closed as the elastic material of the bushing 17 yields to accommodate the roll. After approximately 2½° of roll, further engine roll will be prevented by bottoming of the latter flat against the adjacent portions of the bushing 17 along the large diameter of the oval outer housing member 16.

Engine vibration damping is determined by the relationship of the voids 21 with respect to the solid compressed portion of the bushing 17 along the diameter transverse to the voids 21. It is accordingly apparent that merely by rotating the alignment of the oval holes 12c in the channel sides 12b, the mounting may be readily modified to accommodate minor modifications of the engine or body structure without changing the structure of the bushing assembly 14 or appreciably modifying the mounting brackets 12 and 13. Likewise the same bushing assembly 14 may be employed with different optional engines in the same vehicle body.

I claim:

1. In the method of assembling an automobile engine on a body member, the steps of
   A. providing a bushing assembly comprising inner and outer tubular members of rigid load sustaining material spaced radially by an intermediate elastic bushing bonded to said members under compression therebetween with an elastic detent portion of said bushing extruding radially into the inner tubular member through an opening in the sidewall of the latter,
B. securing said outer tubular member in predetermined fixed relationship on said engine,
C. providing screw threaded clamping means including
  1. a bolt insertable axially through said inner tubular member and
    a. having an annular detent receiving groove dimensioned to receive said detent portion in detent engagement and
    b. located in the outer periphery of said bolt at a predetermined location such that the opposite ends of said bolt extend axially beyond said inner tubular member when said bolt is inserted axially thereinto to a detent position whereat said detent portion extends into said groove, and
  2. enlarged clamping members adjustable with respect to each other on the opposite ends of said bolt,
D. inserting said bolt into said inner tubular member to said detent position whereat said detent portion extends into said groove,
E. providing a pair of bracket elements with each having a bolt guiding and locating slot therein undersize with respect to said clamping members to prevent passage of the latter and opening generally upwardly from a load supporting base for receiving one of each of said opposite bolt ends in supported relationship on said base,
F. securing said bracket elements in predetermined axially spaced relationship on said body member to receive said bushing assembly freely therebetween and with said slots opening upwardly to receive said opposite bolt ends,
G. locating said engine at a partially assembled position with respect to said body member by lowering said engine and guiding said bushing assembly between said axially spaced bracket elements and also guiding said opposite bolt ends downwardly into said upwardly opening slots into supported relationship on the bases of said slots, and
H. tightening said clamping members against said bracket elements to clamp the same tightly against said bushing assembly therebetween.

2. In the method according to claim 1, providing said bracket elements with axially outwardly directed flanges adjacent the upper openings of said slots and overlying said enlarged clamping members when the latter are clamped tightly against said bracket elements, and dimensioning said bolt, so that when the latter is inserted axially into said inner tubular member to said detent position whereat said detent portion extends into said groove, said clamping members on the opposite ends of said bolt will clear said flanges outwardly thereof when said bolt ends are guided downwardly into said slots.

* * * * *